United States Patent [19] [11] 4,075,261
Fujiyoshi et al. [45] Feb. 21, 1978

[54] POWDER COATING COMPOSITION

[75] Inventors: Kanji Fujiyoshi; Yutaka Mizumura; Junji Sono, all of Otsu, Japan

[73] Assignee: Toyo Boseki Kabushiki Kaisha, Osaka, Japan

[21] Appl. No.: 580,376

[22] Filed: May 22, 1975

Related U.S. Application Data

[63] Continuation-in-part of Ser. No. 373,218, June 25, 1973, Pat. No. 3,953,403.

[30] Foreign Application Priority Data

| June 28, 1972 | Japan | 47-65317 |
| June 29, 1972 | Japan | 47-65687 |
| June 27, 1973 | United Kingdom | 30522/73 |
| June 27, 1973 | Germany | 2332749 |
| June 28, 1973 | France | 73 23796 |
| June 27, 1973 | Italy | 68921/73 |

[51] Int. Cl.$^2$ ............ C08L 61/20; C08L 61/28; C08L 67/06
[52] U.S. Cl. ............ 260/850; 260/856; 260/873
[58] Field of Search ............ 260/850, 856

[56] References Cited

U.S. PATENT DOCUMENTS 3,607,975  9/1971  Tsukada et al. ............ 260/850

Primary Examiner—J. Ziegler
Attorney, Agent, or Firm—Barry Kramer

[57] ABSTRACT

A powder coating composition comprising
1. an unsaturated polyester which is prepared by reacting
   a. terephthalic acid or its lower alkyl ester, and
   b. an α-olefinic dicarboxylic acid, and
   c. optionally an organic acid having at least three carboxy groups in the molecule or its functional derivative, and
   d. an aliphatic or alicyclic glycol; and
2. an organic peroxide and a molecular terminal cross linking or bridging agent, said powder coating composition being able to form a film having excellent properties, such as excellent gloss, hardness, impact strength, heat resistance, weatherability and corrosion resistance.

7 Claims, No Drawings

POWDER COATING COMPOSITION

CROSS-REFERENCE TO RELATED APPLICATION

This is a continuation-in-part of application Ser. No. 373,218, filed June 25, 1973, now U.S. Pat. No. 3,953,403.

DETAILED DISCLOSURE

The present invention relates to a thermosetting polyester resin and composition containing thereof useful for powder coating. More particularly, it relates to a polyester based pulverized resinous composition for powder coating, which can form a paint film being superior in gloss, hardness, impact strength, weatherability, and corrosion resistance by coating thereof.

Generally, a thermosetting unsaturated polyester resin is a liquid material comprising an unsaturated-polyester, a liquid vinyl or acryl monomer and a polymerization catalyst, and the cured product has excellent heat resistance and chemical resistance. However, it is unable to be used for powder coating because it is liquid.

For powder coating applications, there have, hitherto, been developed various thermosetting polyester resins.

When unsaturated polyester resins are used to thermoset, however, they are sometimes thermosetted by using a molecular terminal cross-linking or bridging agent, such as organic compound having at least two acid anhydride groups in the molecule (i.e. polyanhydride) or alkoxylatedpolyaminoaldehyde resin, which occasionally does not give enough curing effect.

It has been studied to find an excellent thermosetting polyester based pulverized resinous coating composition having no such defects, and then it has been found that by adding an organic peroxide and a molecular terminal cross-linking agent to a terephthalic acid-based unsaturated polyester, there may be obtained a suitable composition being able to form a paint film having excellent surface smoothness, impact strength, heat resistance, weatherability and corrosion resistance without phenomenon of inclusion of foam or bubble in the film.

The thermosetting polyester resin coating composition of the present invention comprises (1) a terephthalic acid-based unsaturated polyester and (2) an organic peroxide and a molecular terminal cross-linking agent.

The present terephthalic acid-based unsaturated polyester is prepared by reacting a. terephthalic acid or its lower alkyl ester, and
b. an α-olefinic dicarboxylic acid, and
c. optionally an organic acid having at least three carboxy groups in the molecule or its functional derivative, and
d. an aliphatic or alicyclic glycol. That is, it can be prepared by reacting three components of (a), (b) and (d) or by reacting four components of (a), (b), (c) and (d). The terephthalic acid or its lower alkyl ester can be partially replaced with isophthalic acid or orthophthalic acid or their lower alkyl esters. The term "lower alkyl" means a straight or branched alkyl having 1 to 4 carbon atoms (e.g. methyl, ethyl, propyl, isopropyl, butyl, sec-butyl, or tert-butyl).

As the suitable examples of the α-olefinic dicarboxylic acid, there may be maleic acid, maleic anhydride, furmaric acid, citraconic acid, mesaconic acid, itaconic acid, or the like. As the suitable examples of the organic acid having at least three carboxy groups in the molecule or its functional derivative, there may be trimellitic acid, trimellitic anhydride, pyromellitic acid, pyromellitic dianhydride, propane-1,2,3-tricarboxylic acid, butane-1,2,3,4-tetracarboxylic acid, or the like. As the suitable examples of the aliphatic or alicyclic glycol, there may be ethyleneglycol, propyleneglycol, trimethyleneglycol, butanediol, pentanediol, hexanediol, diethylenenglycol, dipropyleneglycol, triethyleneglycol, neopentylglycol, cyclopentanediol, cyclohexanediol, cyclohexanedimethanol, or the like.

The organic peroxide may be the one having decomposition temperature of 110° C. or more, at which the halfvalue period is 10 hours, for instance dicumyl peroxide, di-tertiary butyl peroxide, tertiary butyl cumyl peroxide, cumeme hydroperoxide, para-methane hydroperoxide, tertiary butyl propoxyacetate, tertiary butyl propoxylaurate, or benzoyl peroxide.

The molecular terminal cross-linking agent means a polyanhydride having at least two acid anhydride groups in the molecule or an alkoxylated-polyaminoaldehyde resin. As the suitable examples of the polyanhydride, there may be pyromellitic dianhydride, 2,3,6,7-naphthalenetetracarboxylic acid dianhydride, 3,3',4,4'-diphenyltetracarboxylic dianhydride, 2,2',3,3'-diphenyltetracarboxylic dianhydride, 1,2,5,6-naphthalenetetracarboxylic dianhydride, 2,2-bis (3,4-dicarboxyphenyl)-propane dianhydride, 1,2,3,4-cyclopentanetetracarboxylic dianhydride, benzophenonetetracarboxylic dianhydride, bis(3,4-dicarboxyphenyl) ether dianhydride, 3,4,9,10-perylenetetracarboxylic dianhydride, ethylene bis(trimellitate) dianhydride, hydroquinone bis (trimellitate) dianhydride, bisphenol A bis-(trimellitate) dianhydride, p,p'-phenylene bis(thiotrimellitate) dianhydride, glycerin tris(trimellitate) trianhydride, trimethylolethane trimellitate trianhydride, or the like. The alkoxylatedpolyaminoaldehyde resin is in general a thermosetting aminoplast condensate, for instance an alkoxylated condensation product of an aldehyde (e.g. formaldehyde) with a polyamino compound (e.g. urea), aminotriazines (e.g. melamine) or substituted aminotriazines (e.g. benzoguanamine), and the suitable examples may be hexamethoxymethyl melamine (CYMEL 300, made by American Cyanamid Company, USA), pentamethoxy methyl monomethyl melamine, or a two molar condensate thereof having medium methoxylation degree of the methylol group of 4.0 to 5.5 (e.g. SUMIMAL M40S, M50S, made by Sumitomo Chemical Company, Japan), a mixture of methyl and ethyl etherate of tetramethylolbenzoguanamine (e.g. UFORMITE QR 366, made by Rhom & Haas Company, USA), or the like.

The present unsaturated polyester can be prepared by conventional methods, such as ester exchange method, or direct esterification method, and further there may be used conventional catalyst, various modifiers and stabilizers. The suitable proportions of each components (a), (b), (c) and (d) to be employed in preparing the unsaturated polyester may be in the following ranges. When the polyester is prepared from the components (a), (b), (c) and (d), (a)/(b)/ (c) is in a range of 50/40/10 to 94/5/1 by molar ratio and total glycol (d)/total acids (a)+(b)+(c) is in a range of 1.1 to 2.0 by molar ratio. When the polyester is prepared from the components (a), (b) and (d), (a)/(b) is in a range of 60/40 to 90/10 by molar ratio and total glycol (d)/total acids (a)+(b) is in a range of 1.1 to 2.0 by molar ratio. The suitable molecular weight of the unsaturated polyester may be in a range of 2300 to 3500.

The unsaturated polyester thus obtained can be mixed with both an organic peroxide and a terminal cross-linking agent to give the curable powder coating composition. When the polyester is prepared from four components of (a), (b), (c) and (d), a polyanhydride may be preferably used as the terminal cross-linking agent, and when the polyester is prepared from the three components of (a), (b) and (d), an alkoxylated-polyaminoaldehyde resin may be preferably used as the terminal cross-linking agent. The proportions of the organic peroxide and the terminal cross-linking agent to the polyester may be preferably in a range of 0.1 to 3 parts by weight of the organic peroxide and in a range of 1 to 7 parts by weight of the terminal cross-linking agent on the basis of 100 parts by weight of the polyester.

The present powder coating composition can be prepared by a conventional method, for instance, polyester, organic peroxide and terminal cross-linking agent are homogeneously compounded by a mixer, a roll mill or a kneader, and then the resulting compounded material is ground or pulverized to the desired small particle size. The suitable particle size is 100μ or less.

In the present composition, there may be optionally added a polyacrylic acid ester, such as poly(methyl acrylate), poly(ethyl acrylate), poly(butyl acrylate), poly(lauryl acrylate), poly(2-ethylhexyl acrylate), and poly(methoxyethyl acrylate). Furthermore, there may be added other agents for improving the film property or coloring the paint, for instance, various pigments, fillers, stabilizers and modifiers, such as benzoin, benzophenone, benzilic acid, para-phenylphenol or stearyl alcohol at the compounding operation.

The powder coating composition of the present invention can be applied to various substrates by conventional methods, such as flam spray coating, fluidized bed coating, electrostatic spray coating, and the like. For instance, according to electrostatic spray coating method, the finely divided powder of the present powder coating composition is homogeneously attracted on the surface of article to be coated by electrostatic action and subsequently the coated article is heated at 150° to 250° C. for 10 to 30 minutes in a hot air dryer to cure the coating composition.

The present powder coating composition can form a film having excellent surface and mechanical and chemical properties, e.g. excellent gloss, hardness, impact strength, heat resistance, weatherability and corrosion resistance.

The preparation of the unsaturated polyesters and the powder coating compositions are illustrated by the following examples but the present invention is not limited thereto. In the examples, "part" means part by weight, and the measurement of various properties of the film are carried out by the following methods:

Gloss: it is shown by light reflector coefficient (%) at 60° reflection.

Hardness: it is measured by pencil test.

Impact strength: it is measured by using Du Pont impact tester.

Erichsen ductility test: it is carried out by using Erichsen capping tester.

Heat resistance: it is shown by the time which the film does not show any defect when it is held at 150° C. in air.

Boiling water resistance: it is shown by the time for which the film does not show any defect when it is dipped in boiling water at 100° C.

Weatherability: it is shown by the time for which the film does not show any defect when it is irradiated with Xenon weather-ometer (ASTM E 240).

Corrosion resistance: it is carried out according to the provision of ASTM B 117-64 (salt spray test).

EXAMPLE 1

Into 2 liter flask provided with distillation vessel, stirrer and thermometer were added dimethyl terephthalate (a: 780g), ethyleneglycol (d: 399g), neopentylglycol (d: 243g) and zinc acetate (0.526g; as a catalyst). The mixture was heated by gradually rising the temperature for 4 hours to subject it to ester exchange reaction. The distillation of methanol was started at 130° to 140° C. After elevating the temperature of the reaction mixture up to 230° C., the distillation vessel was allowed to cool, and thereby the ester exchange reaction was completed.

After the reaction, fumaric acid (b: 209g), trimellitic anhydride (C: 35g) and para-tertiary butylcatechol (0.498g; as a polymerization inhibitor) were added to the reaction mixture. The mixture was heated up to 250° C. for a period of 30 minutes to subject it to esterification reaction and maintained under the same condition for total 120 minutes. After the esterification reaction, the pressure of the reaction vessel was gradually lowered to 3 mmHg at 250° C. The rough vacuum time was 50 minutes. After the rough vacuum, it was subjected to full vacuum and then the mixture was subjected to polymerization reaction for 30 minutes at 0.3 to 0.5 mmHg. The polyester were faint yellow and had a sintering point of 70° to 72° C. which was measured by a micro melting point apparatus and a molecular weight of 2900 which was measured by a vapor pressure osometer.

In the above example, the proportions of the components (by molar ratio) were (a)/(b)/(c): 67/30/3, ethyleneglycol/neopentylglycol of the component (d) : 7/3, and acid/glycol, i.e., (a)+(b)+(c)/(d): 1/1.3, as made clear from the amounts mentioned above.

EXAMPLE 2

In the same manner as described in Example 1, the ester exchange reaction was carried out by using dimethyl terephthalate (a: 920g), ethyleneglycol (d: 391g), neopentylglycol (d: 281g) and zinc acetate (0.526g), and to the reaction mixture were added fumaric acid (b: 112g), trimellitic anhydride (c: 58g) and para-tertiary butylcatechol (0.498g) and the mixture was subjected to esterification reaction. After the esterification reaction, the pressure of the reaction vessel was gradually lowered to 3 mmHg and then the mixture was polymerized under full vacuum for 30 minutes. The polyester thus obtained had a sintering point of 70° -72° C. and a molecular weight of 3100. The proportions of the components (by molar ratio) were (a)/(b)/(c): 79/16/5, ethyleneglycol/neopentylglycol of the component (d): 7/3, and acid/glycol: 1/1.5.

EXAMPLE 3

In the same manner as described in Example 1 except that maleic anhydride (b: 95g) was used, there was obtained polyester having a sintering poing of 70° -72° C. and a molecular weight of 2700.

EXAMPLE 4

Into a glass made flask provided with thermometer, stirred and reflux condenser for removing methanol were added dimethyl terephthalate (a: 140g), ethyleneglycol (d: 46.9g), neopentylglycol (d: 52.4g), zinc acetate (0.063g, as a catalyst) and antimony trioxide (0.021g, as a catalyst). The flask was heated on mantle heater. The distillation of methanol was started at around 130° C. and then the mixture was subjected to ester exchange reaction for 3.5 hours. The final temperature was 220° C. After the distillation of methanol, fumaric acid (b: 20.9g) and paratertiary butylcatechol (0.075g) were added to the reaction mixture to subject it to esterification reaction (reaction time: 60 minutes, final temperature: 260° C.). After the reaction, the pressure of the reaction vessel was gradually lowered to 20 mmHg for a period of 30 minutes and the vessel was maintained under the reduced pressure for 20 minutes to complete polymerization reaction.

The polyester thus obtained was faint yellow, transparent substance and had a sintering point of 70° C. and a molecular weight of 3000.

The proportion of the components (by molar ratio) were dimethyl terephthalate/fumaric acid: 8/2, ethyleneglycol/neopentylglycol: 6/4, and total glycol/total acid: 1.40.

EXAMPLE 5

Into a flask as used in Example 4 were added diethyl terephthalate (a: 815g), ethyleneglycol (d: 339g), neopentylglycol (d: 243g), zinc acetate (0.370g) and antimony trioxide (0.122g). The mixture was subjected to ester exchange reaction in the same manner as described in Example 4. After the reaction, to the reaction mixture were added fumaric acid (b: 209g) and para-tertiary butylcatechol (0.498g). The mixture was subjected to esterification reaction and then to polymerization reaction under a reduced pressure in the same manner as described in Example 4. The polyester thus obtained was faint yellow and transparent and had a sintering point of 64° C. and a molecular weight of 2600.

In the above example, the molar ratio of dimethylterephthalate/fumaric acid was 7/3, ethyleneglycol/neopentylglycol was 7/3 by mol and total glycol/total acid was 1.30 by mol.

EXAMPLE 6

In the same manner as described in Example 4 except that maleic anhydride (170g) was used instead of fumaric acid, there was obtained polyester having a molecular weight of 2800.

EXAMPLE 7

The polyester (100 parts) obtained in Example 1 to 3 was mixed with pyromellitic anhydride (4parts), dicumyl peroxide (1 part), titanium oxide (30 parts) and poly(ethyl acrylate) (0.5 part). The mixture was compounded by twinscrew-kneading kisc extruder (made by Werner & Pfleiderer Co.) to give the homogeneous composition.

The composition was pulverized to 150 mesh or less and sprayed onto a steel plate by using Ransburg type electrostatic powder sprayer and baked with hot air at 200°–250° C. for 10 to 30 minutes to give a smooth and glossy film. When tertiary butyl peroxide or para-methane hydroperoxide was used as the organic peroxide, the similar effect was achieved.

The film obtained by using the composition of the above example had the following properties.
Gloss: 90%
Hardness: 3H
Erichsen ductility test: 7 m/m
Impact strength: ½inch × 500g × 40 cm, good
Heat resistance: more than 2 hours
Boiling water resistance: more than 1 hour
Weatherability: more than 1000 hours
Corrosion resistance: more than 500 hours

EXAMPLE 8

The polyester (100 parts) obtained in Examples 4 to 6 was mixed with hexamethoxymethyl melamine (3 parts), dicumyl peroxide (2 parts), titanium oxide (30 parts) and poly(ethyl acrylate) (0.5 part) and the mixture was treated in the same manner as described in Example 7 to give the desired composition.

The composition was pulverized to 150 mesh or less and sprayed onto a steel plate by using Ransburg type electrostatic powder sprayer and baked with hot air at 160° –200° C. for 10 to 30 minutes. The film thus obtained was smooth and glossy and there was observed no foam in the film, even in the above coating thickness of 100μ.

EXAMPLE 9

The polyester (100 parts) obtained in Example 4 to 6 was mixed with methoxymethyl melamine (degree of methoxylation: 4.5 0 5.0; "SUMIMAL M40S", made Sumitomo Chemical Company: 3 parts), para-methane hydroperoxide (1 part), titanium oxide (30 parts) and poly(ethyl acrylate) (0.5 part) and the mixture was compounded and further pulverized and sprayed in the same manner as described in Example 8 to give a film having good glossness without any foam at thick coating. The properties of the film were as follows:
Gloss: 90% or more
Hardness: 3H
Erichsen ductility test: 7 m/m
Impact strength: ½ inch × 500g × 40 cm, good
Heat resistance: more than 2 hours
Boiling water resistance: more than 1 hour
Weatherability: more than 1000 hours
Corrosion resistance: more than 500 hours

What is claimed is:

1. A powder coating composition comprising
   1. a terephthalic acid-based unsaturated polyester which is prepared by reacting
      a. terephthalic acid or its lower alkyl ester, and
      b. an α-olefinic dicarboxylic acid or its anhydride, and
      c. optionally, an organic acid having at least three carboxy groups in the molecule or its anhydride, and
      d. an aliphatic or alicyclic glycol; and
   2. an organic peroxide and an alkoxylatedpolyamino aldehyde resin.

2. The powder coating composition according to claim 1, wherein the organic peroxide is contained in a range of 0.1 and 3 parts by weight and the alkoxylatedpolyamino aldehyde resin is contained in a range of 1 to 7 parts by weight of the basis of 100 parts by weight of the polyester.

3. The powder coating composition according to claim 1, wherein the unsaturated polyester (1 ) is prepared by reacting four components (a), (b), (c) and (d).

4. The powder coating composition according to claim 1, wherein the unsaturated polyester (1) is prepared by reacting three components (a), (b) and (d).

5. The powder coating composition according to claim 1, wherein the alkoxylated-polyaminoaldehyde resin is a member selected from the group consisting of hexamethoxymethylmelamine, pentamethoxymethylmonomethyl melamine, a two molar condensate thereof having medium methoxylation degree of the methylol group of 4.0 to 5.5, and a mixture of methyl and ethyl etherate of tetramethylolbenzoguanamine.

6. The powder coating composition according to claim 1, wherein the α-olefinic dicarboxylic component (b) is a member selected from the group consisting of maleic acid, maleic anhydride, fumaric acid, citraconic acid, measconic acid and itaconic acid; the organic acid component (c) is a member selected from the group consisting of trimellitic acid, trimellitic anhydride, pyromellitic acid, pyromellitic dianhydride, propane-1,2,3-tricarboxylic acid and butane-1, 2,3,4-tetracarboxylic acid; and the aliphatic or alicyclic glycol component (d) is a member selected from the group consisting of ethyleneglycol, propyleneglycol, trimethyleneglycol, butanediol, pentanediol, hexanediol, diethyleneglycol, dipropyleneglycol, triethyleneglycol, neopentylglycol, cyclopentanediol, cyclohexanediol, and cyclohexanedimethanol.

7. The powder coating composition according to claim 1, wherein the organic peroxide is a member selected from the group consisting of dicumyl peroxide, di-tertiary butyl peroxide, tertiary butyl cumyl peroxide, cumene hydroperoxide, paramethane hydroperoxide, tertiary butyl propoxyacetate, tertiary butyl propoxyaurate and benzoyl peroxide.

* * * * *

UNITED STATES PATENT OFFICE
CERTIFICATE OF CORRECTION

Patent No. 4,075,261          Dated February 21, 1978

Inventor(s) Kanji Fujiyoshi et al

It is certified that error appears in the above-identified patent and that said Letters Patent are hereby corrected as shown below:

In Claim 7, last line, "poxyaurate" should read --poxylaurate--.

Signed and Sealed this

Sixth Day of June 1978

[SEAL]

Attest:

RUTH C. MASON
*Attesting Officer*

DONALD W. BANNER
*Commissioner of Patents and Trademarks*